US012215882B2

(12) United States Patent
Sakata et al.

(10) Patent No.: US 12,215,882 B2
(45) Date of Patent: Feb. 4, 2025

(54) AIR CONDITIONER SYSTEM

(71) Applicant: DAIKIN INDUSTRIES, LTD., Osaka (JP)

(72) Inventors: Youko Sakata, Osaka (JP); Shouta Hori, Osaka (JP); Satoshi Hashimoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 149 days.

(21) Appl. No.: 17/471,847

(22) Filed: Sep. 10, 2021

(65) Prior Publication Data

US 2021/0404691 A1 Dec. 30, 2021

Related U.S. Application Data

(63) Continuation of application No. PCT/JP2020/012271, filed on Mar. 19, 2020.

(30) Foreign Application Priority Data

Apr. 22, 2019 (JP) ................................. 2019-080991

(51) Int. Cl.
   *F24F 11/67* (2018.01)
   *F24F 11/80* (2018.01)
(52) U.S. Cl.
   CPC .............. *F24F 11/67* (2018.01); *F24F 11/80* (2018.01)
(58) Field of Classification Search
   CPC .. F24F 11/67; F24F 11/80; F24F 11/81; F24F 11/86; F24F 2110/10; F24F 2110/12;
   (Continued)

(56) References Cited

U.S. PATENT DOCUMENTS

| 5,039,008 A | * | 8/1991 | Sugawara | .......... G05D 23/1919 |
| | | | | 236/46 F |
| 2012/0103556 A1 | * | 5/2012 | Lee | .......................... F24F 11/66 |
| | | | | 165/201 |

(Continued)

FOREIGN PATENT DOCUMENTS

| CN | 105241019 A | 1/2016 |
| EP | 1 998 118 A1 | 12/2008 |

(Continued)

OTHER PUBLICATIONS

Nogami, Temperature Pulsating Air-Conditioner (annotated), 1993 (Year: 1993).*

(Continued)

*Primary Examiner* — Nelson J Nieves
*Assistant Examiner* — Matthew John Moscola
(74) *Attorney, Agent, or Firm* — Birch, Stewart, Kolasch & Birch, LLP

(57) ABSTRACT

An air conditioner system (1) runs in a concentration keeping mode to sequentially repeat a first operation of lowering a target temperature to a first target temperature lower than a predetermined reference temperature and a second operation of raising the target temperature to a second target temperature higher than the reference temperature. The target temperature is gradually raised from the first target temperature to the second target temperature in the second operation. Lowering the target temperature to the first target temperature in the first operation takes shorter time than raising the target temperature to the second target temperature in the second operation.

20 Claims, 8 Drawing Sheets

(58) Field of Classification Search
CPC ............... F24F 2110/20; F24F 2110/22; F24F 2110/70; F24F 2130/30; F24F 11/65; G05D 23/1919; Y02B 30/70
See application file for complete search history.

(56) References Cited

U.S. PATENT DOCUMENTS

| | | | |
|---|---|---|---|
| 2016/0161137 | A1 | 6/2016 | Chen et al. |
| 2018/0336775 | A1* | 11/2018 | Callemo ............... F24H 15/395 |
| 2019/0268999 | A1* | 8/2019 | Oobayashi ............... F24F 11/62 |
| 2020/0263894 | A1* | 8/2020 | Oobayashi ............... F24F 11/79 |
| 2021/0041121 | A1* | 2/2021 | Park ....................... F24F 1/0035 |
| 2021/0181698 | A1* | 6/2021 | Smith ..................... G05B 15/02 |
| 2021/0231332 | A1* | 7/2021 | Taniguchi ................ F24F 11/61 |
| 2022/0090812 | A1* | 3/2022 | Kato ........................ F24F 11/62 |

FOREIGN PATENT DOCUMENTS

| | | | |
|---|---|---|---|
| EP | 2233849 | A1 | 9/2010 |
| EP | 2 447 614 | A2 | 5/2012 |
| EP | 3 078 919 | A1 | 10/2016 |
| EP | 3 029 389 | A2 | 6/2018 |
| JP | 2-157550 | A | 8/1990 |
| JP | 6-82075 | B2 | 10/1994 |
| JP | 7-4713 | A | 1/1995 |
| JP | 7-103542 | A | 4/1995 |
| JP | 9-79655 | A | 3/1997 |
| JP | 2001-355893 | A | 12/2001 |
| JP | 2009-133499 | A | 6/2009 |
| JP | 2010-96382 | A | 4/2010 |
| JP | 2012-1056 | A | 1/2012 |
| JP | 2016-109422 | A | 6/2016 |
| JP | 2016-161165 | A | 9/2016 |
| JP | 2019-43301 | A | 3/2019 |
| KR | 10-1611738 | B1 | 4/2016 |

OTHER PUBLICATIONS

Tanaka, Indoor Environment Control System (annotated), 2015 (Year: 2015).*
International Preliminary Report on Patentability and English translation of the Written Opinion of the International Searching Authority dated Nov. 4, 2021 for Application No. PCT/JP2020/012271.
Extended European Search Report for European Application No. 20795614.5, dated Oct. 31, 2022.
International Search Report (PCT/ISA/210) issued in PCT/JP2020/012271, mailed on Jun. 23, 2020.
European Communication pursuant to Article 94(3) EPC for European Application No. 20795614.5, dated Oct. 19, 2023.

* cited by examiner

FIG.8
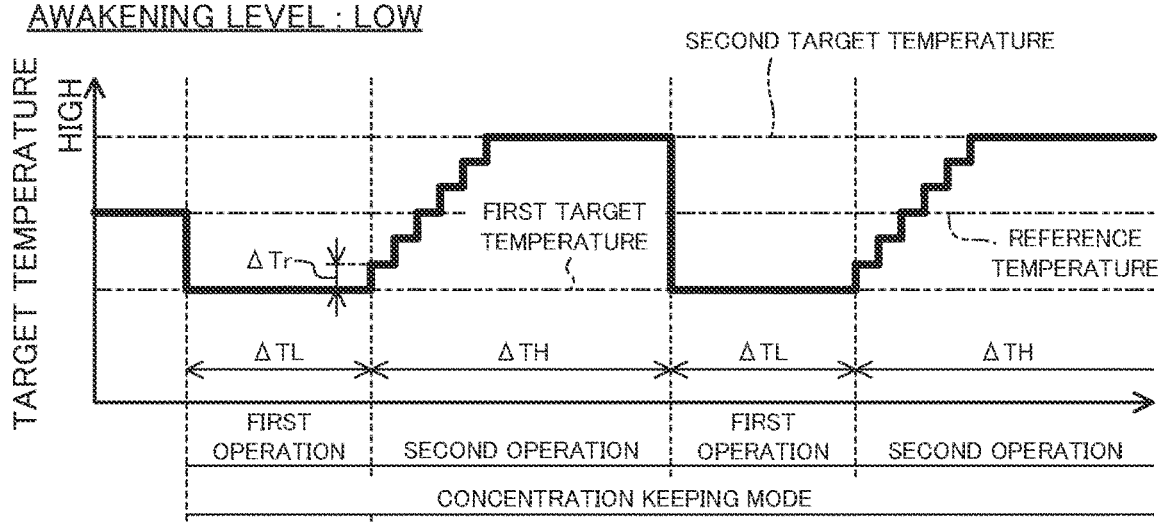
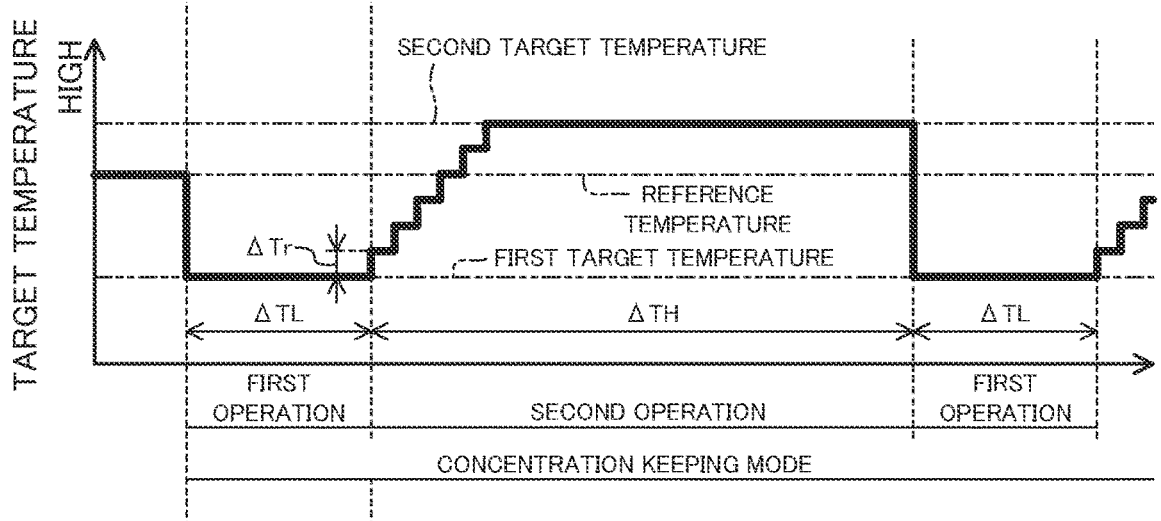
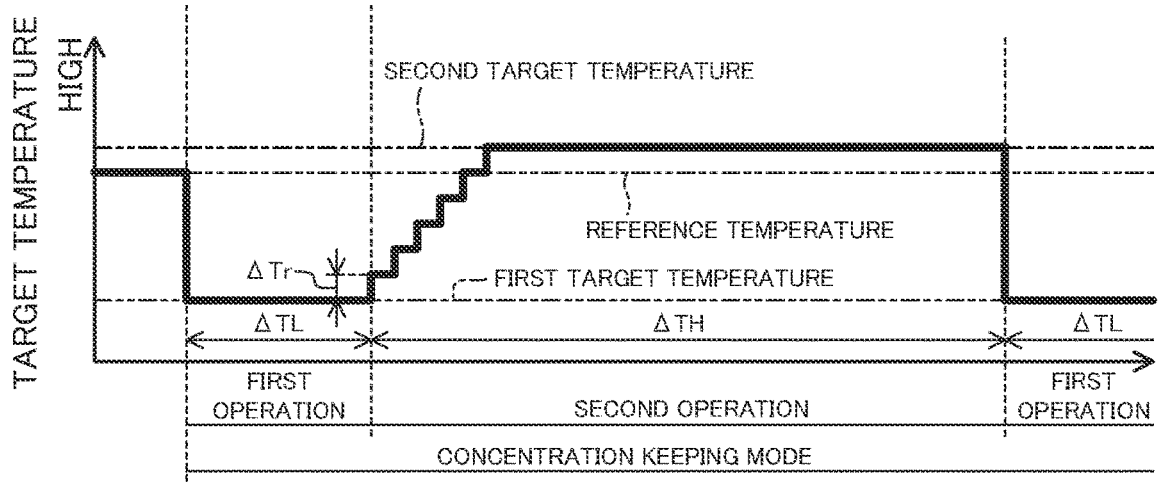

AIR CONDITIONER SYSTEM

CROSS REFERENCE TO RELATED APPLICATIONS

This application is a Continuation of PCT International Application No. PCT/JP2020/012271, filed on Mar. 19, 2020, which claims priority under 35 U.S.C § 119 (a) to Japanese Patent Application No. 2019-080991, filed on Apr. 22, 2019. Each of the above applications is hereby expressly incorporated by reference, in its entirety, into the present application.

TECHNICAL FIELD

The present disclosure relates to an air conditioner system.

BACKGROUND ART

An air conditioner system that controls temperature, humidity, wind speed, and any other values based on a sensible temperature and thermal comfort of a person in a room to provide more comfortable indoor environment has been proposed (see, e.g., Patent Document 1). Standard new effective temperature (SET) has been known as an index of the sensible temperature of the person in the room, and predicted mean vote (PMV) as an index of the thermal comfort of the person in the room.

CITATION LIST

Patent Document

Patent Document 1: Japanese Unexamined Patent Publication No. 2009-133499

SUMMARY

A first aspect of the present disclosure is directed to an air conditioner system (1) including: a temperature regulator (37) configured to regulate a temperature of an indoor air; an indoor air temperature detector (45) configured to detect the temperature of the indoor air; and a control unit (11) configured to control the temperature regulator (37) so that the temperature detected by the indoor air temperature detector (45) approaches a target temperature.

The control unit (11) runs in a first mode to sequentially perform a first operation of lowering the target temperature to a first target temperature lower than a predetermined reference temperature and a second operation of raising the target temperature to a second target temperature higher than the reference temperature, each at least once. The target temperature is gradually raised from the first target temperature to the second target temperature in the second operation. Lowering the target temperature to the first target temperature in the first operation takes shorter time than raising the target temperature to the second target temperature in the second operation.

BRIEF DESCRIPTION OF THE DRAWINGS

FIG. 8 shows the control unit running a first mode to sequentially perform a first operation of lowering the target temperature and a second operation of raising the target temperature.

DESCRIPTION OF EMBODIMENTS

First Embodiment

A first embodiment will be described below.

An air conditioner system (1) according to the first embodiment is a system that helps a person (101) in a room to keep concentration on work, and is used to condition the air in a room where the person (101) works, such as an office and a study room.

—Configuration of Air Conditioner System—

Figure 1:
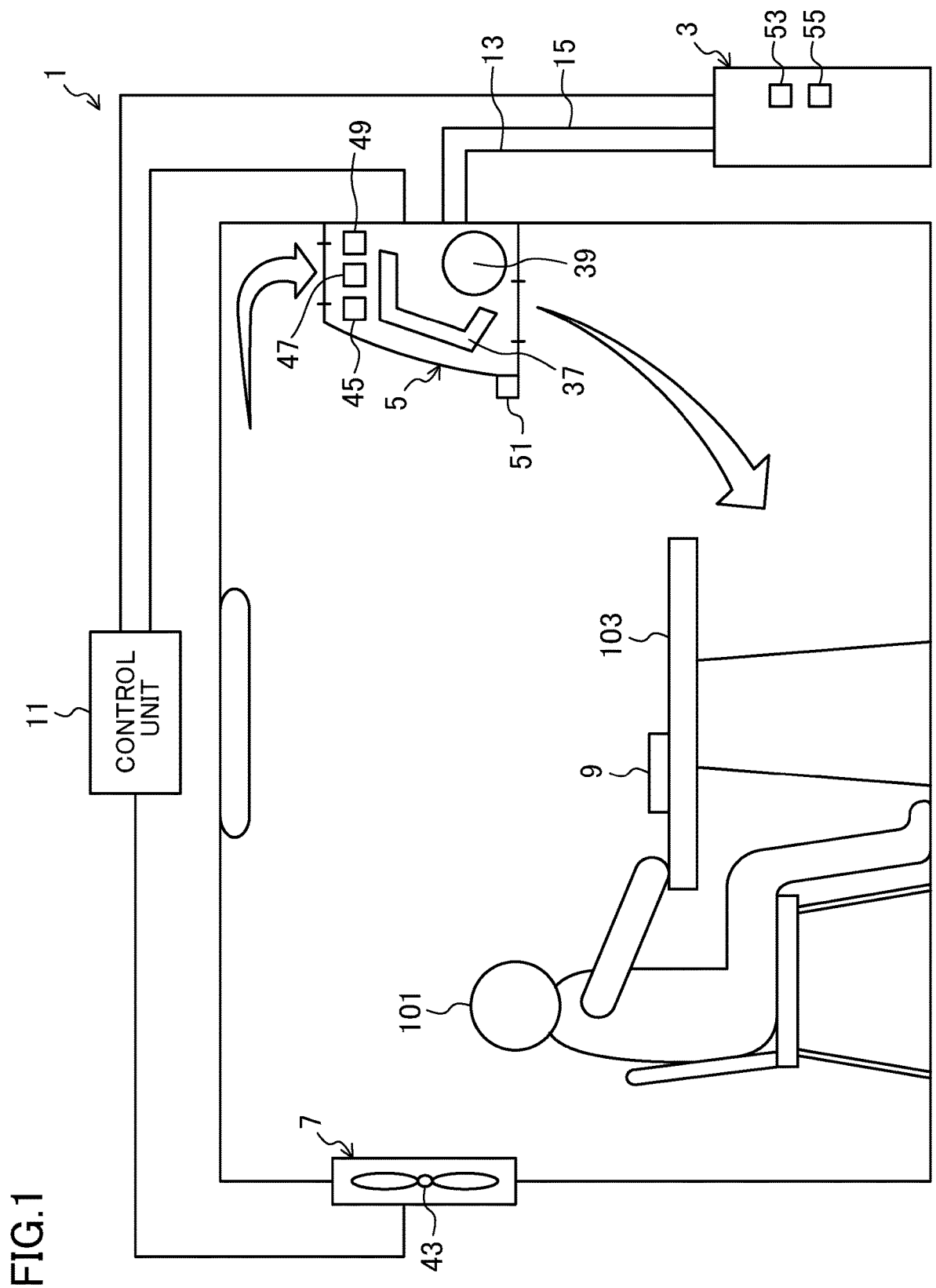
FIG. 1 is a schematic view generally illustrating an air conditioner system of an embodiment.

As illustrated in FIG. 1, the air conditioner system (1) includes an outdoor unit (3) placed outside the room, an indoor unit (5) and a ventilator (7) placed inside the room, a remote controller (9), various sensors (45, 47, 49, 51, 53, 55), and a control unit (11) that comprehensively controls the operation of the air conditioner system (1).

<Outdoor Unit and Indoor Unit>

Figure 2:
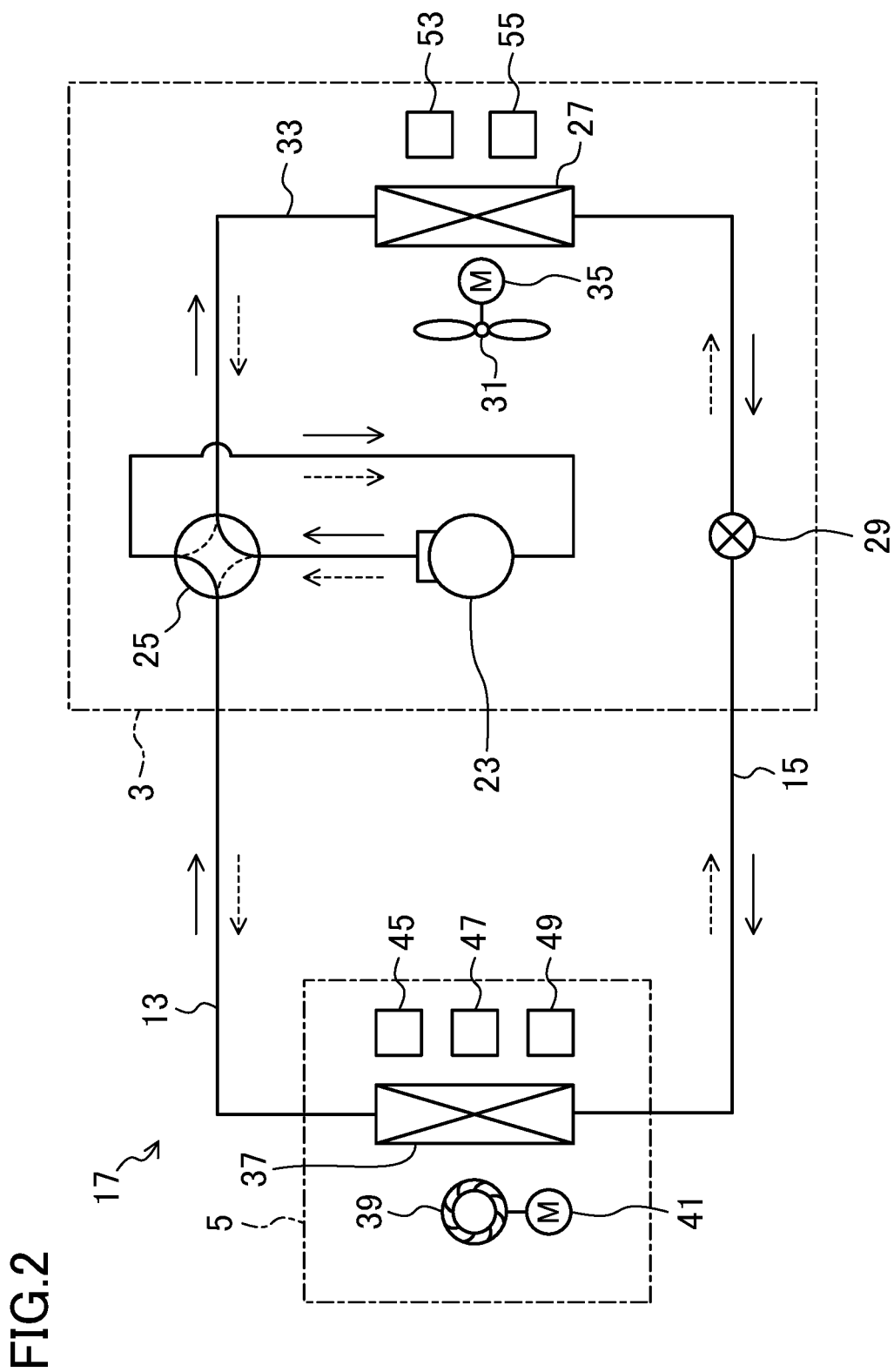
FIG. 2 is a diagram illustrating a refrigerant circuit constituting the air conditioner system of the embodiment.

The outdoor unit (3) and the indoor unit (5) are connected with connection pipes (13, 15) to form a refrigerant circuit (17) shown in FIG. 2. A refrigerant fills and circulates in the refrigerant circuit (17) to perform a vapor compression refrigeration cycle. For example, R32 refrigerant is used as the refrigerant. The refrigerant circuit (17) includes an outdoor circuit (19) and an indoor circuit (21).

The outdoor unit (3) is placed outdoors, for example, on a rooftop of a building, on the ground beside a building, or on a veranda. The outdoor unit (3) includes a compressor (23), a four-way switching valve (25), an outdoor heat exchanger (27), an expansion valve (29), and an outdoor fan (31). The compressor (23), the four-way switching valve (25), the outdoor heat exchanger (27), and the expansion valve (29) are connected in this order with a refrigerant pipe (33) to form the outdoor circuit (19).

The compressor (23) sucks and compresses a refrigerant and discharges the compressed refrigerant. The compressor (23) is configured as an inverter compressor having a variable capacity. The compressor (23) is, for example, a rotary compressor. The outdoor fan (31) is arranged near the outdoor heat exchanger (27). An outdoor fan motor (35) drives the outdoor fan (31). The outdoor fan (31) is configured as, for example, a propeller fan. The outdoor fan (31) transfers outdoor air and allows the outdoor air to pass through the outdoor heat exchanger (27).

The outdoor heat exchanger (27) allows heat exchange between the outdoor air transferred by the outdoor fan (31) and a refrigerant flowing in the outdoor heat exchanger. The outdoor heat exchanger (27) is configured as, for example, a fin-and-tube heat exchanger. The expansion valve (29) is a control valve having a variable opening degree. The expansion valve (29) decompresses the refrigerant flowing through the valve. The expansion valve (29) is configured as, for example, an electronic expansion valve.

The four-way switching valve (25) switches a flow path of the refrigerant in the refrigerant circuit (17) between a first state (a state indicated by solid curves in FIG. 2) and a second state (a state indicated by broken curves in FIG. 2). The four-way switching valve (25) in the first state makes a discharge side of the compressor (23) and the outdoor heat exchanger (27) communicate with each other, and makes a suction side of the compressor (23) and the indoor heat exchanger (37) communicate with each other. The four-way switching valve (25) in the second state makes the discharge side of the compressor (23) and the indoor heat exchanger (37) communicate with each other, and makes the suction side of the compressor (23) and the outdoor heat exchanger (27) communicate with each other.

The indoor unit (5) is attached to, for example, a wall surface or ceiling of the room. The indoor unit (5) shown in FIG. 1 is a wall-mounted unit attached to the wall surface. The indoor unit (5) includes the indoor heat exchanger (37) and an indoor fan (39). The indoor heat exchanger (37) constitutes the indoor circuit (21). The indoor fan (39) is arranged near the indoor heat exchanger (37). An indoor fan motor (41) drives the indoor fan (39).

The indoor fan (39) is, for example, a cross-flow fan. The indoor fan (39) transfers indoor air and allows the indoor air to pass through the indoor heat exchanger (37). The indoor heat exchanger (37) allows heat exchange between the indoor air transferred by the indoor fan (39) and the refrigerant flowing in the indoor heat exchanger (37). The indoor heat exchanger (37) is configured as, for example, a fin-and-tube heat exchanger. The indoor heat exchanger (37) is an example of a temperature regulator that regulates the temperature of the indoor air.

When the four-way switching valve (25) of the refrigerant circuit (17) is in the first state, a refrigeration cycle in which the outdoor heat exchanger (27) functions as a condenser, and the indoor heat exchanger (37) functions as a radiator (evaporator) is performed, i.e., the refrigerant flows in a direction indicated by solid arrows in FIG. 2. When the four-way switching valve (25) of the refrigerant circuit (17) is in the second state, a refrigeration cycle in which the outdoor heat exchanger (27) functions as a radiator (evaporator), and the indoor heat exchanger (37) functions as a condenser is performed, i.e., the refrigerant flows in a direction indicated by broken arrows in FIG. 2.

—Ventilator—

The ventilator (7) is attached to, for example, a wall surface or ceiling of the room. The ventilator (7) shown in FIG. 1 is a wall-mounted unit attached to the wall surface. The ventilator (7) has a ventilation fan (43) and optionally a duct. The ventilation fan (43) takes the outdoor air into the room and discharges the indoor air to the outside. A ventilation fan motor (not shown) drives the ventilation fan (43).

<Remote Controller>

The remote controller (9) is a separate component from the indoor unit (5), and is often placed near the person (101) in the room, e.g., on a desk (103) on which the person (101) works. The remote controller (9) is configured to be operable by the person (101) in the room. Although not shown, the remote controller (9) includes an operation unit that is operated by the person (101) in the room and a display unit that displays predetermined information. The remote controller (9) is wirelessly connected to the control unit (11). The remote controller (9) outputs an operation signal to the control unit (11).

The operation unit allows turning the air conditioner system (1) on and off, switching the system between operating modes and control modes, setting an awakening level in a concentration keeping mode, which will be described later, and entering correction information about a reference temperature, which will be described later. The operation unit has a plurality of buttons to be operated to perform such various operations. The plurality of buttons include a concentration button for turning on and off the concentration keeping mode to be described later, and a selector button for setting the awakening level.

Setting of the awakening level in the concentration keeping mode includes, for example, three grades of "low," "medium," and "high." The "awakening level" represents the intensity of a cool stimulus to the person (101) in the room in the concentration keeping mode. Details of the setting of the awakening level will be described later.

The correction information inputted on the operation unit is information on individual characteristics of the person (101) in the room different from the others. The correction information may be information on a sensation of hot or cold of the person (101) in the room (abstract information, e.g., whether the person is sensitive to hot or cold). The correction information may be information on a specific correction temperature, such as +1.0° C. or −1.0° C. Alternatively, the correction information may be personal parameters related to a thermal sensation, such as sex, age, metabolic rate, body fat percentage, and blood pressure of the person (101) in the room.

The display unit displays information such as a set temperature (reference temperature), humidity of the indoor air, and an operating mode. Examples of the information on the operating mode include whether the air conditioner system is in a cooling operation or a heating operation, whether the system is running in the concentration keeping mode to be described later, and the awakening level set in the concentration keeping mode.

<Sensors>

The sensors include an indoor air temperature sensor (45), an indoor air humidity sensor (47), a $CO_2$ concentration sensor (49), an illuminance sensor (51), an outdoor air temperature sensor (53), and an outdoor air humidity sensor (55). These sensors (45, 47, 49, 51, 53, 55) are connected to the control unit (11) via wires or wirelessly. Each sensor (45, 47, 49, 51, 53, 55) outputs a detection signal to the control unit (11). The indoor air temperature sensor (45) is an example of an indoor air temperature detector. The $CO_2$ concentration sensor (49) is an example of a carbon dioxide concentration detector.

The indoor air temperature sensor (45), the indoor air humidity sensor (47), the $CO_2$ concentration sensor (49), and the illuminance sensor (51) are provided, for example, in the indoor unit (5). The indoor air temperature sensor (45) detects the temperature of the indoor air sucked into the indoor unit (5). The indoor air humidity sensor (47) detects the humidity of the indoor air sucked into the indoor unit (5). The $CO_2$ concentration sensor (49) detects the $CO_2$ concentration (carbon dioxide concentration) of the indoor air sucked into the indoor unit (5). The illuminance sensor (51) detects brightness (illuminance) in the room.

The outdoor air temperature sensor (53) and the outdoor air humidity sensor (55) are provided, for example, in the outdoor unit (3). The outdoor air temperature sensor (53) detects the temperature of the outdoor air sucked into the outdoor unit (3). The outdoor air humidity sensor (55) detects the humidity of the outdoor air sucked into the outdoor unit (3).

<Control Unit>

Figure 3:
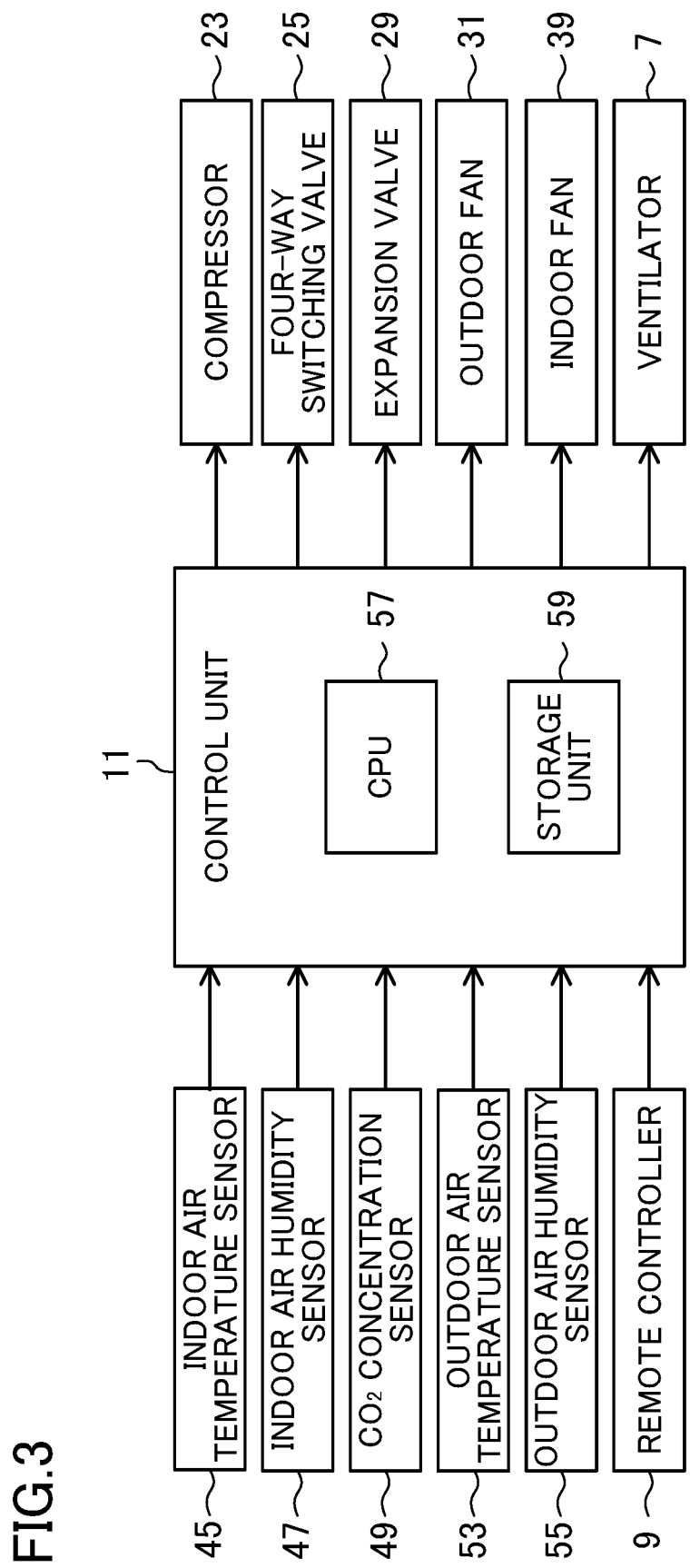
FIG. 3 is a block diagram illustrating the configuration of the air conditioner system of the embodiment.

The control unit (11) is a controller based on a well-known microcomputer. As illustrated in FIG. 3, the control unit (11) includes a central processing unit (CPU) (57) that executes programs, and a storage unit (59) that stores various programs that run on the central processing unit and data. The storage unit (59) is configured as a memory such as a read only memory (ROM), and a random access memory (RAM). The control unit (11) is installed in, for example, the indoor unit (5).

The control unit (11) calculates control amounts of the outdoor unit (3) including the compressor (23), the four-way switching valve (25), the expansion valve (29), and the outdoor fan (31), the indoor unit (5) including the indoor fan (39), and the ventilator (7) including the ventilation fan (43) in accordance with the detection signals of the indoor air temperature sensor (45), the indoor air humidity sensor (47), the $CO_2$ concentration sensor (49), the illuminance sensor (51), the outdoor air temperature sensor (53), and the outdoor air humidity sensor (55), and the operation signal from the remote controller (9). The control unit (11) outputs a control signal related to the calculated control amount to the outdoor unit (3), the indoor unit (5), and the ventilator (7).

The storage unit (59) stores relationship information indicating a relationship between a comfortable indoor air temperature at which the person (101) in the room feels comfortable and at least one of the humidity of the indoor air, the $CO_2$ concentration of the indoor air, the indoor illuminance, the temperature of the outdoor air, or the humidity of the outdoor air. Examples of the relationship information include information of an adaptive model of thermal comfort known as an adaptive comfort model.

Figure 4:
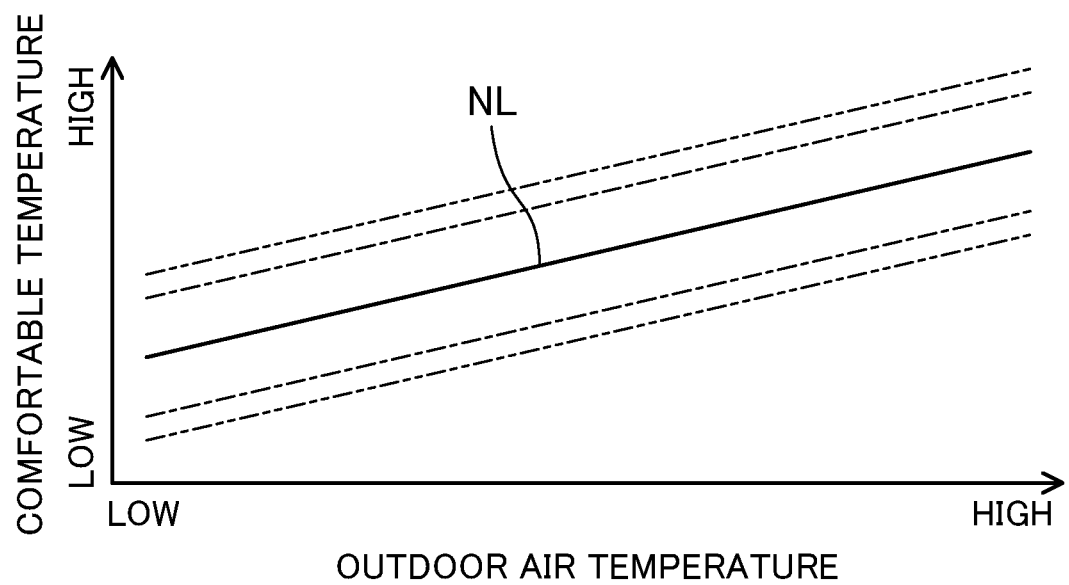
FIG. 4 is a conceptual drawing of relationship information (adaptive model of thermal comfort) used in the air conditioner system of the embodiment.

The comfortable temperature for the person (101) in the room varies depending on adaptability of the person to the environment and the outdoor air temperature. The adaptive model of thermal comfort is a model obtained by regression analysis of statistical information based on the indoor air temperature and the reported thermal sensation of the person (101) in the room, and is information indicating the relationship between the outdoor air temperature and the comfortable temperature as shown in the graph of FIG. 4. The adaptive model of thermal comfort shown in FIG. 4 indicates that the comfortable temperature rises as the outdoor air temperature rises. In FIG. 4, a range between the upper and lower dot-dot-dash lines is a range of the comfortable temperature at which statistically 90% of humans feel comfortable, and a range between the upper and lower dot-dash lines is a range of the comfortable temperature at which statistically 80% of humans feel comfortable.

The control unit (11) estimates the comfortable temperature for the person (101) in the room based on the outdoor air temperature detected by the outdoor air temperature sensor (53) using the relationship information stored in the storage unit (59), i.e., the information of the adaptive model of thermal comfort in the first embodiment. A typical concept of neutral temperature which is neither hot nor cold and comfortable for humans has been known as a concept of temperature related to comfortability. In the adaptive model of thermal comfort shown in FIG. 4, an intermediate temperature indicated by the solid line NL within the range of the comfortable temperature can be regarded as the neutral temperature. The control unit (11) estimates the neutral temperature calculated from the outdoor air temperature using the adaptive model of thermal comfort to be the comfortable temperature for the person (101) in the room.

The control unit (11) automatically sets the reference temperature based on the estimated comfortable temperature. If no correction information on the reference temperature is inputted in the remote controller (9), the control unit (11) sets the estimated comfortable temperature as the reference temperature. If the correction information of the reference temperature is inputted in the remote controller (9), the control unit (11) corrects the reference temperature in accordance with the correction information.

For example, if information that the person (101) in the room is sensitive to heat is inputted as the correction information, correction is made to lower the reference temperature by a predetermined temperature. If information that the person (101) in the room is sensitive to cold is inputted as the correction information, correction is made to raise the reference temperature by a predetermined temperature. If information on a specific correction temperature is inputted as the correction information, correction is made to raise or lower the reference temperature in accordance with the correction temperature. If a personal parameter related to the thermal sensation is inputted as the correction information, correction is made to raise or lower the reference temperature by a predetermined temperature determined according to the personal parameter.

The control unit (11) may be able to set the reference temperature in accordance with the operation signal from the remote controller (9). The reference temperature may be manually set by the person in the room operating the remote controller (9).

The control unit (11) controls the operations of the outdoor unit (3) and the indoor unit (5) in a designated operating mode (cooling operation or heating operation) in accordance with the operation signal from the remote controller (9), and controls the operation of the air conditioner system (1) in accordance with the detection signals from the various sensors (45, 47, 49, 51, 53, 55) described above.

The control unit (11) has a plurality of control modes, and controls the operations of the outdoor unit (3), the indoor unit (5), and the ventilator (7) in the control mode set in accordance with the operation signal from the remote controller (9). Examples of the control modes of the control unit (11) includes a concentration keeping mode for boosting the concentration of the person (101) in the room, and a normal operation mode to which the control unit (11) shifts when the concentration keeping mode is off. The term "boost the concentration of the person (101) in the room" is to allow the person (101) in the room to stay comfortable without feeling drowsy. The concentration keeping mode is an example of a first mode.

The control unit (11) controls the operation of the ventilator (7) in accordance with the $CO_2$ concentration of the indoor air detected by the $CO_2$ concentration sensor. The $CO_2$ concentration is one of indices to the evaluation of the quality of the indoor air. The higher $CO_2$ concentration of the indoor air may make the person feel more worn or tired, or feel drowsy. Thus, the $CO_2$ concentration of the indoor air is desirably kept from becoming too high.

The control unit (11) operates the ventilator (7) when the $CO_2$ concentration in the room detected by the $CO_2$ concentration sensor (49) is equal to or more than a predetermined first reference value. The first reference value is set to, for example, 1000 ppm in accordance with a standard defined for environmental management of buildings. The control unit (11) stops the ventilator (7) when the $CO_2$ concentration of the indoor air detected by the $CO_2$ concentration sensor

(49) falls below a predetermined second reference value. The second reference value is set to, for example, 900 ppm.

—Operation of Air Conditioner System—

The air conditioner system (1) controls the temperature of the indoor air by switching between the cooling operation and the heating operation according to the operating mode set by the remote controller (9). In either of the cooling operation and the heating operation, the system runs in the concentration keeping mode when the concentration button of the remote controller (9) is pressed, and cancels the concentration keeping mode when the concentration button is pressed again.

<Cooling Operation>

In the cooling operation, the four-way switching valve (25) is set in the first state. The refrigerant compressed by the compressor (23) dissipates heat (condenses) in the outdoor heat exchanger (27) functioning as a radiator. The refrigerant that has dissipated heat is decompressed by the expansion valve (29), and then flows through the indoor heat exchanger (37) functioning as an evaporator. The refrigerant absorbs heat from the indoor air to evaporate in the indoor heat exchanger (37). The indoor air cooled in the indoor heat exchanger (37) is blown into the room by the indoor fan (39). The evaporated refrigerant is sucked into the compressor (23). In the cooling operation, condensed water is generated near the indoor heat exchanger (37).

If the temperature detected by the indoor air temperature sensor (45) is lower than the target temperature by a predetermined first temperature or more in the cooling operation, the system stops the compressor (23) to block the refrigerant from flowing through the refrigerant circuit (17), thereby stopping the indoor heat exchanger (37). The indoor fan (39) is kept in operation. In the first embodiment, the first temperature serving as a reference for stopping the indoor heat exchanger (37), i.e., a temperature difference between the indoor air temperature and the target temperature, is set to 1.0° C., for example. The indoor heat exchanger (37) starts operating again when the temperature detected by the indoor air temperature sensor (45) reaches the target temperature.

<Heating Operation>

In the heating operation, the four-way switching valve (25) is set in the second state. The refrigerant compressed by the compressor (23) flows through the indoor heat exchanger (37) functioning as a radiator (condenser). The refrigerant dissipates heat to the indoor air to condense in the indoor heat exchanger (37). The indoor fan (39) blows the indoor air heated in the indoor heat exchanger (37) into the room. The condensed refrigerant is decompressed by the expansion valve (29), and then evaporates in the outdoor heat exchanger (27). The evaporated refrigerant is sucked into the compressor (23).

If the temperature detected by the indoor air temperature sensor (45) exceeds the target temperature by a predetermined second temperature or more in the heating operation, the system stops the compressor (23) to block the refrigerant from flowing through the refrigerant circuit (17), thereby stopping the indoor heat exchanger (37). The indoor fan (39) is kept in operation. In the first embodiment, the second temperature serving as a reference for stopping the indoor heat exchanger (37), i.e., a temperature difference between the indoor air temperature and the target temperature, is set to 1.0° C., for example. The indoor heat exchanger (37) starts operating again when the temperature detected by the indoor air temperature sensor (45) reaches the target temperature.

<Normal Operation Mode>

In the normal operation mode, the reference temperature is set to the target temperature. The reference temperature changes depending on the variation of the outdoor air temperature detected by the outdoor air temperature sensor (53) in accordance with the estimation control using the information of the adaptive model of thermal comfort. Thus, the target temperature is updated according to the variation of the outdoor air temperature. In the normal operation mode, the indoor heat exchanger (37) is controlled so that the temperature detected by the indoor air temperature sensor (45) approaches the target temperature.

<Concentration Keeping Mode>

In the concentration keeping mode, the first operation and the second operation are sequentially performed, each at least once. The first operation is an operation of lowering the target temperature to a first target temperature lower than the reference temperature. The second operation is an operation of raising the target temperature to a second target temperature higher than the reference temperature. Lowering the target temperature to the first target temperature in the first operation takes shorter time than raising the target temperature to the second target temperature in the second operation. This will be described in further detail by way of the control in the first operation and the second operation described later.

In the concentration keeping mode, the indoor heat exchanger (37) is controlled so that the temperature detected by the indoor air temperature sensor (45) approaches the first target temperature in the first operation, and the indoor heat exchanger (37) is controlled so that the temperature detected by the indoor air temperature sensor (45) approaches the second target temperature in the second operation. The first operation and the second operation are alternately repeated while the system is running in the concentration keeping mode.

The first and second target temperatures are determined according to the awakening level set by the remote controller (9). The setting of the awakening level is reflected in a decrement of the first target temperature from the reference temperature and an increment of the second target temperature from the reference temperature. The decrement of the first target temperature and the increment of the second target temperature are set so that a temperature difference between the first and second target temperatures is 3° C. or less, for example. The reason for this setting is that the indoor air temperature, if varies in a range greater than 3° C., lays a burden on the body of the person (101) in the room.

At the awakening level "low," for example, the decrement of the first target temperature from the reference temperature is set to 1.5° C., and the increment of the second target temperature from the reference temperature is set to 1.5° C. At this level, the first target temperature is set to be a temperature lower than the reference temperature by 1.5° C., and the second target temperature is set to be a temperature higher than the reference temperature by 1.5° C. Thus, at the awakening level "low," the decrement of the first target temperature from the reference temperature is relatively small.

At the awakening level "medium," for example, the decrement of the first target temperature from the reference temperature is set to 2.0° C., and the increment of the second target temperature from the reference temperature is set to 1.0° C. At this level, the first target temperature is set to be a temperature lower than the reference temperature by 2.0° C., and the second target temperature is set to be a temperature higher than the reference temperature by 1.0° C. Thus, at the awakening level "medium," the decrement of the first target temperature from the reference temperature is greater than that at the awakening level "low."

At the awakening level "high," for example, the decrement of the first target temperature from the reference temperature is set to 2.5° C., and the increment of the second target temperature from the reference temperature is set to 0.5° C. At this level, the first target temperature is set to be a temperature lower than the reference temperature by 2.5° C., and the second target temperature is set to be a temperature higher than the reference temperature by 0.5° C. Thus, at the awakening level "high," the decrement of the first target temperature from the reference temperature is greater than that at the awakening level "medium."

In the first operation, the target temperature is set to the first target temperature immediately after the start of the first operation. In the second operation, the target temperature is not set to the second target temperature immediately after the start of the second operation, but is raised stepwise from the first target temperature to the second target temperature. Specifically, the target temperature is gradually raised from the first target temperature to the second target temperature by 0.5° C. every 30 seconds. The reason why the target temperature is raised stepwise by 0.5° C. is that the first temperature serving as a reference for stopping the indoor heat exchanger (37), i.e., the temperature difference between the indoor air temperature and the target temperature, is set to 1.0° C. Such a control can keep the indoor heat exchanger (37) from stopping in the cooling operation.

Suppose Ta is the reference temperature and Ts is the target temperature, execution time of the first operation and execution time of the second operation are set so that an integrated value of the temperature difference between the reference temperature Ta and the target temperature Ts (Ta−Ts) in a period performing the first operation is equal to an integrated value of the temperature difference between the target temperature Ts and the reference temperature Ta (Ts−Ta) in a period performing the second operation.

Specifically, the execution time of the first operation and the execution time of the second operation are set to satisfy the following relational expression (1), where Ta represents the reference temperature, Ts1 the first target temperature, Ts2 the second target temperature, ΔTL the execution time of the first operation, ΔTH the execution time of the second operation, and ΔTr the stepwise increment of the target temperature in the second operation.

[Expression 1]

$$Ta = \frac{(Ts1 \cdot \Delta TL) + Ts2 \cdot (\Delta TH - \Delta Tr \cdot N) + \sum_{i=1}^{N}\{(Ts1 + \Delta Tr \cdot i) \cdot \Delta Tr\}}{(\Delta TL + \Delta TH)} \quad (1)$$

where N=(Ts2−Ts1)/ΔTr, and N>1

The execution time of the first operation ΔTL is set to, for example, four minutes or less. This is because the person (101) in the room easily feels cold if the person stays in an environment of a cool indoor temperature for more than four minutes. In the first embodiment, the execution time of the first operation (ΔTL) is set to, for example, four minutes.

As shown in FIG. 8, the execution time of the second operation ΔTH is set based on the awakening level in accordance with the above relational expression (1).

At the awakening level "low" (i.e., when the decrement of the first target temperature Ts1 from the reference tempera-ture Ta is 1.5° C., the increment of the second target temperature Ts2 from the reference temperature Ta is 1.5° C., the execution time of the first operation ΔTL is four minutes, and the stepwise increment of the target temperature in the second operation ΔTr is 0.5° C.), the execution time of the second operation ΔTH is set to 6.5 minutes from the above relational expression (1).

At the awakening level "medium" (i.e., when the decrement of the first target temperature Ts1 from the reference temperature Ta is 2.0° C., the increment of the second target temperature Ts2 from the reference temperature Ta is 1.0° C., the execution time of the first operation ΔTL is four minutes, and the stepwise increment of the target temperature in the second operation ΔTr is 0.5° C.), the execution time of the second operation ΔTH is set to 11.75 minutes from the above relational expression (1).

At the awakening level "high" (i.e., when the decrement of the first target temperature Ts1 from the reference temperature Ta is 2.5° C., the increment of the second target temperature Ts2 from the reference temperature Ta is 0.5° C., the execution time of the first operation ΔTL is four minutes, and the stepwise increment of the target temperature in the second operation ΔTr is 0.5° C.), the execution time of the second operation ΔTH is set to 27.5 minutes from the above relational expression (1).

—Concentration Keeping Mode in Cooling Operation—

Figure 5:
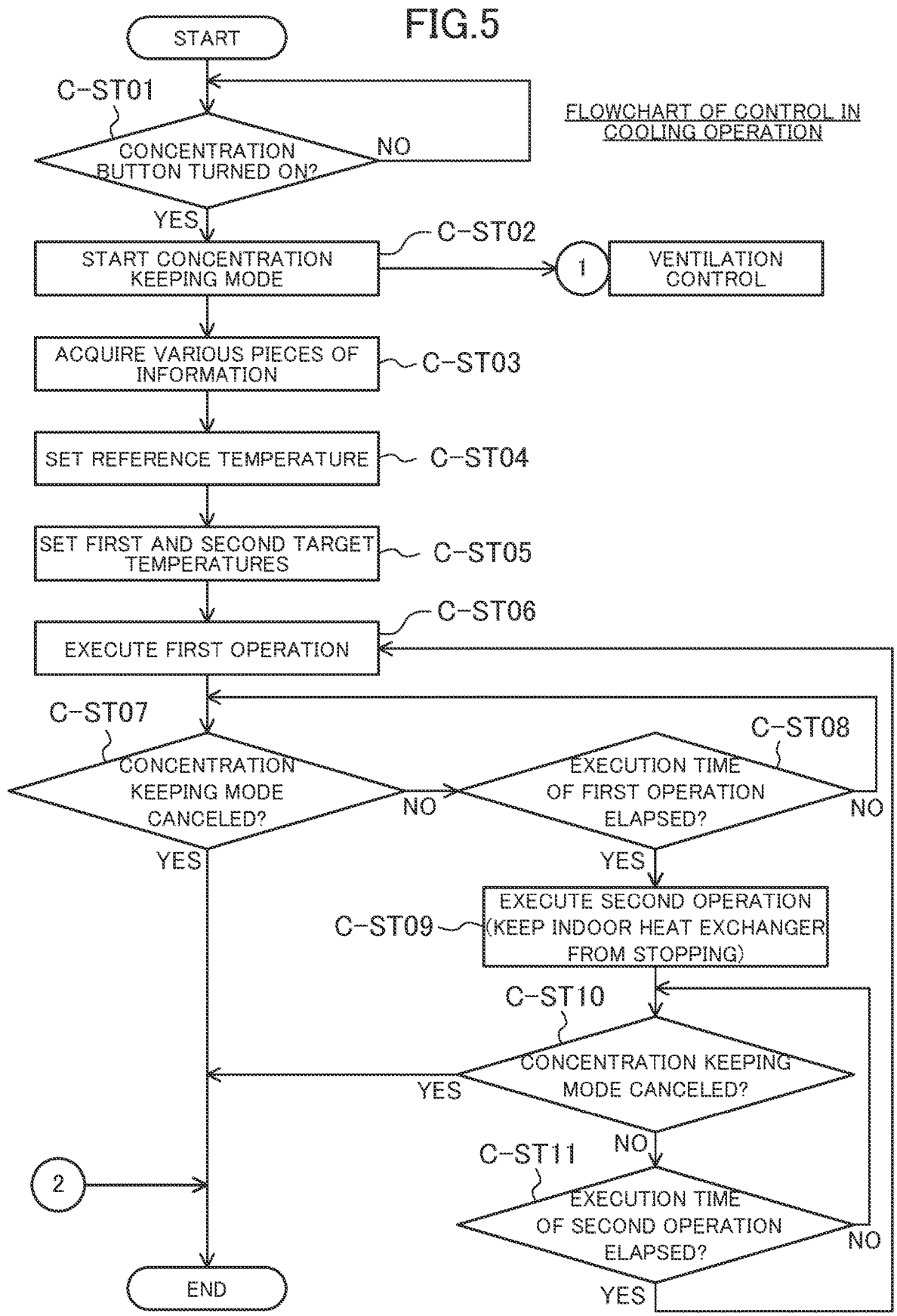
FIG. 5 is a flowchart of a concentration keeping mode in a cooling operation of the air conditioner system of the embodiment.

The air conditioner system (1) runs in the concentration keeping mode in the cooling operation according to the flowchart shown in FIG. 5.

As illustrated in FIG. 5, in step C-ST01 after a startup in the cooling operation, whether the concentration button is pressed is first determined in accordance with the operation signal from the remote controller (9). If the concentration button is not determined to be pressed in step C-ST01 (NO is selected), the process returns to repeat step C-ST01, and whether the concentration button is pressed is monitored.

If the concentration button is determined to be pressed in step C-ST01 (YES is selected), the process proceeds to the next step C-ST02. In step C-ST02, the concentration keeping mode starts. Then, the process proceeds to step C-ST03. Ventilation control to be described later is executed in parallel with the steps after step C-ST03.

In step C-ST03, detection signals of various sensors (45, 47, 49, 51, 53, 55) are read to acquire information on the indoor and outdoor environments, such as the indoor air temperature, the indoor air humidity, the indoor illuminance, the outdoor air temperature, and the outdoor air humidity. In addition, information on the setting by the remote controller (9) is read to acquire correction information on the person (101) in the room related to the reference temperature and information on the set awakening level. Then, the process proceeds to step C-ST04.

In step C-ST04, the information on the adaptive model of thermal comfort is used to estimate the comfortable temperature (neutral temperature) for the person (101) in the room based on the outdoor air temperature acquired in step C-ST03, and the estimated comfortable temperature is set as the reference temperature. If the correction information on the reference temperature has been set by the remote controller (9) at this time, the reference temperature is corrected based on the correction information. Then, the process proceeds to step C-ST05.

In step C-ST05, the first and second target temperatures are set based on the reference temperature set in step C-ST04 and the information on the set awakening level acquired in step C-ST03. The execution time of the first operation ΔTL and the execution time of the second operation ΔTH are determined based on the information on the set awakening level acquired in step C-ST03. Then, the process proceeds to step C-ST06.

In step C-ST06, the first operation starts, and the target temperature is set to the first target temperature. This quickly lowers the temperature of the indoor air to be lower than the reference temperature. Thus, the lowered indoor temperature makes the person (101) in the room feel cool, giving a cool stimulus corresponding to the set awakening level to the person (101) in the room. Then, the process proceeds to step C-ST07.

In step C-ST07, whether the concentration button is pressed again on the remote controller (9) to cancel the concentration keeping mode is determined. If the concentration keeping mode is determined to be canceled in step C-ST07 (YES is selected), the concentration keeping mode ends and the system shifts to the normal operation mode. If the concentration keeping mode is not determined to be canceled in step C-ST07 (NO is selected), the process proceeds to step C-ST08.

In step C-ST08, whether the execution time of the first operation ($\Delta$TL) has elapsed is determined. If it is not determined in step C-ST08 that the execution time of the first operation ($\Delta$TL) has elapsed (NO is selected), the process returns to step C-ST07, and steps C-ST07 and C-ST08 are repeated until the concentration keeping mode is canceled or the execution time of the first operation elapses. If it is determined in step C-ST08 that the execution time of the first operation ($\Delta$TL) has elapsed (YES is selected), the process proceeds to step C-ST09.

In step C-ST09, the second operation starts in place of the first operation, and the target temperature is raised stepwise from the first target temperature to the second target temperature.

If the target temperature is set higher than the temperature detected by the indoor air temperature sensor (45) by the first temperature (1.0° C.) or more, the indoor fan (39) operates, although the indoor heat exchanger (37) is stopped. This releases moisture adhering to the indoor heat exchanger (37) into the room together with the air blown into the room and increases the humidity of the room, possibly making the person (101) in the room feel uncomfortable. In the first embodiment, the target temperature is gradually raised from the first target temperature to the second target temperature by 0.5° C. every 30 seconds as described above. Thus, the temperature detected by the indoor air temperature sensor (45) is less likely to fall below the target temperature by the first temperature (1.0° C.) or more, thereby keeping the indoor heat exchanger (37) from stopping.

Then, in step C-ST10, whether the concentration button is pressed again on the remote controller (9) to cancel the concentration keeping mode is determined. If the concentration keeping mode is determined to be canceled in step C-ST10 (YES is selected), the concentration keeping mode ends and the system shifts to the normal operation mode. If the concentration keeping mode is not determined to be canceled in step C-ST10 (NO is selected), the process proceeds to step C-ST11.

In step C-ST11, whether the execution time of the second operation ($\Delta$TH) has elapsed is determined. If it is not determined in step C-ST11 that the execution time of the second operation ($\Delta$TH) has elapsed (NO is selected), the process returns to step C-ST10, and steps C-ST10 and C-ST11 are repeated until the concentration keeping mode is canceled or the execution time of the second operation ($\Delta$TH) elapses. If it is determined in step C-ST11 that the execution time of the second operation ($\Delta$TH) has elapsed (YES is selected), the process returns to step C-ST06, and the first operation starts in place of the second operation.

The first and second operations are repeated in the concentration keeping mode during the cooling operation until the person (101) in the room operates the remote controller (9) to cancel the concentration keeping mode. The operation in the concentration keeping mode regulates the average temperature of the indoor air for the total period of a cycle of performing the first operation and the second operation, each once, to the comfortable temperature, while periodically giving a cool stimulus to the person in the room.

—Concentration Keeping Mode in Heating Operation—

Figure 6:
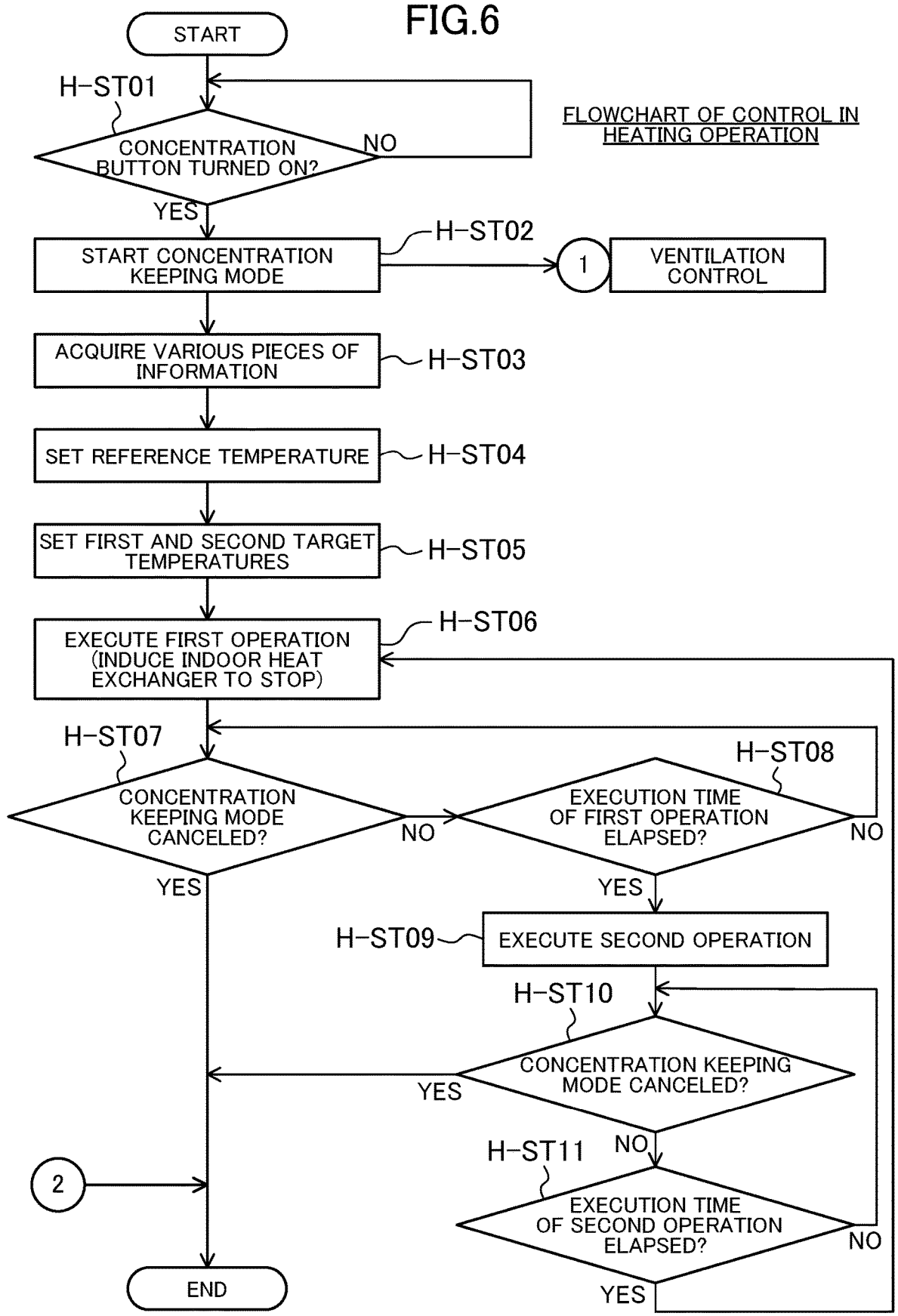
FIG. 6 is a flowchart of a concentration keeping mode in a heating operation of the air conditioner system of the embodiment.

The air conditioner system (1) runs in the concentration keeping mode in the heating operation according to the flowchart shown in FIG. 6.

As illustrated in FIG. 6, in step H-ST01 after a startup of the heating operation, whether the concentration button is pressed is first determined in accordance with the operation signal from the remote controller (9). If the concentration button is not determined to be pressed in step H-ST01 (NO is selected), the process returns to repeat step H-ST01, and whether the concentration button is pressed is monitored.

If the concentration button is determined to be pressed in step H-ST01 (YES is selected), the process proceeds to the next step H-ST02. In step H-ST02, the concentration keeping mode starts. Then, the process proceeds to step H-ST03. Ventilation control to be described later is executed in parallel with the steps after step H-ST03.

In step H-ST03, detection signals of various sensors (45, 47, 49, 51, 53, 55) are read to acquire information on the indoor and outdoor environments, such as the indoor air temperature, the indoor air humidity, the indoor illuminance, the outdoor air temperature, and the outdoor air humidity. In addition, information on the setting by the remote controller (9) is read to acquire correction information on the reference temperature and information on the set awakening level. Then, the process proceeds to step H-ST04.

In step H-ST04, the information on the adaptive model of thermal comfort is used to estimate the comfortable temperature (neutral temperature) for the person (101) in the room based on the outdoor air temperature acquired in step H-ST03, and the estimated comfortable temperature is set as the reference temperature. If the correction information on the reference temperature has been set by the remote controller (9) at this time, the reference temperature is corrected based on the correction information.

Then, the process proceeds to step H-ST05. In step H-ST05, the first and second target temperatures are set based on the reference temperature set in step H-ST04 and the information on the set awakening level acquired in step H-ST03. The execution time of the first operation $\Delta$TL and the execution time of the second operation $\Delta$TH are determined based on the information on the set awakening level acquired in step H-ST03. Then, the process proceeds to step H-ST06.

In step H-ST06, the first operation starts, and the target temperature is set to the first target temperature.

At this time, the first target temperature is lower than the reference temperature by 1.5° C. or more at any awakening level. Thus, the temperature detected by the indoor air temperature sensor (45) immediately after the start of the first operation is higher than the first target temperature by the first temperature (1.0° C.) or more, and the indoor heat exchanger (37) stops. This quickly lowers the temperature of the indoor air to be lower than the reference temperature. Thus, the lowered indoor temperature makes the person (101) in the room feel cool, giving a cool stimulus corresponding to the set awakening level to the person (101) in the room. If the temperature detected by the indoor air temperature sensor (45) reaches the first target temperature in the first operation, the indoor heat exchanger (37) starts operating again. Then, the process proceeds to step H-ST07.

In step H-ST07, whether the concentration button is pressed on the remote controller (9) to cancel the concentration keeping mode is determined. If the concentration keeping mode is determined to be canceled in step H-ST07 (YES is selected), the concentration keeping mode ends and the system shifts to the normal operation mode. If the concentration keeping mode is not determined to be canceled in step H-ST07 (NO is selected), the process proceeds to step H-ST08.

In step H-ST08, whether the execution time of the first operation (ΔTL) has elapsed is determined. If it is not determined in step H-ST08 that the execution time of the first operation (ΔTL) have elapsed (NO is selected), the process returns to step H-ST07, and steps H-ST07 and H-ST08 are repeated until the concentration keeping mode is canceled or the execution time of the first operation (ΔTL) elapses. If it is determined in step H-ST08 that the execution time of the first operation (ΔTL) has elapsed (YES is selected), the process proceeds to step H-ST09.

In step H-ST09, the second operation starts in place of the first operation, and the target temperature is raised stepwise from the first target temperature to the second target temperature.

At this time, if the target temperature is quickly raised from the first target temperature to the second target temperature, the indoor air temperature suddenly rises due to the heating operation of the air conditioner system. Such a sudden rise in the indoor air temperature expands the blood vessel of the person (101) in the room, promoting heat radiation of the body. This lowers the core body temperature and makes the person (101) in the room easily feel drowsy. In the first embodiment, as described above, the target temperature is gradually raised from the first target temperature to the second target temperature by 0.5° C. every 30 seconds. This can reduce the expansion of the blood vessel of the person (101) in the room, avoiding the person (101) in the room from easily feeling drowsy.

Then, in step H-ST10, whether the concentration button is pressed again on the remote controller (9) to cancel the concentration keeping mode is determined. If the concentration keeping mode is determined to be canceled in step H-ST10 (YES is selected), the concentration keeping mode ends and the system shifts to the normal operation mode. If the concentration keeping mode is not determined to be canceled in step H-ST10 (NO is selected), the process proceeds to step H-ST11.

In step H-ST11, whether the execution time of the second operation (ΔTH) has elapsed is determined. If it is not determined in step H-ST11 that the execution time of the second operation (ΔTH) has elapsed (NO is selected), the process returns to step H-ST10, and steps H-ST10 and H-ST11 are repeated until the concentration keeping mode is canceled or the execution time of the second operation (ΔTH) elapses. If it is determined in step H-ST11 that the execution time of the second operation (ΔTH) has elapsed (YES is selected), the process returns to step H-ST06, and the first operation starts in place of the second operation.

The first and second operations are repeated in the concentration keeping mode during the heating operation until the person (101) in the room operates the remote controller (9) to cancel the concentration keeping mode. The operation in the concentration keeping mode regulates the average temperature of the indoor air for the total period of a cycle of performing the first operation and the second operation, each once, to the comfortable temperature, while periodically giving a cool stimulus to the person in the room.

As can be seen in the foregoing, the control of the cooling operation in the concentration keeping mode and the control of the heating operation in the concentration keeping mode are almost the same, but are different in two points. One is that the indoor heat exchanger (37) keeps operating in the first operation in the concentration keeping mode during the cooling operation, while the indoor heat exchanger (37) stops operating in the first operation in the concentration keeping mode during the heating operation. The other is that the target temperature is gradually raised to avoid the indoor heat exchanger (37) from stopping in the second operation in the concentration keeping mode during the cooling operation, while the target temperature is gradually raised to avoid the person (101) in the room from easily feeling drowsy in the second operation in the concentration keeping mode during the heating operation.

<Ventilation Control>

Figure 7:
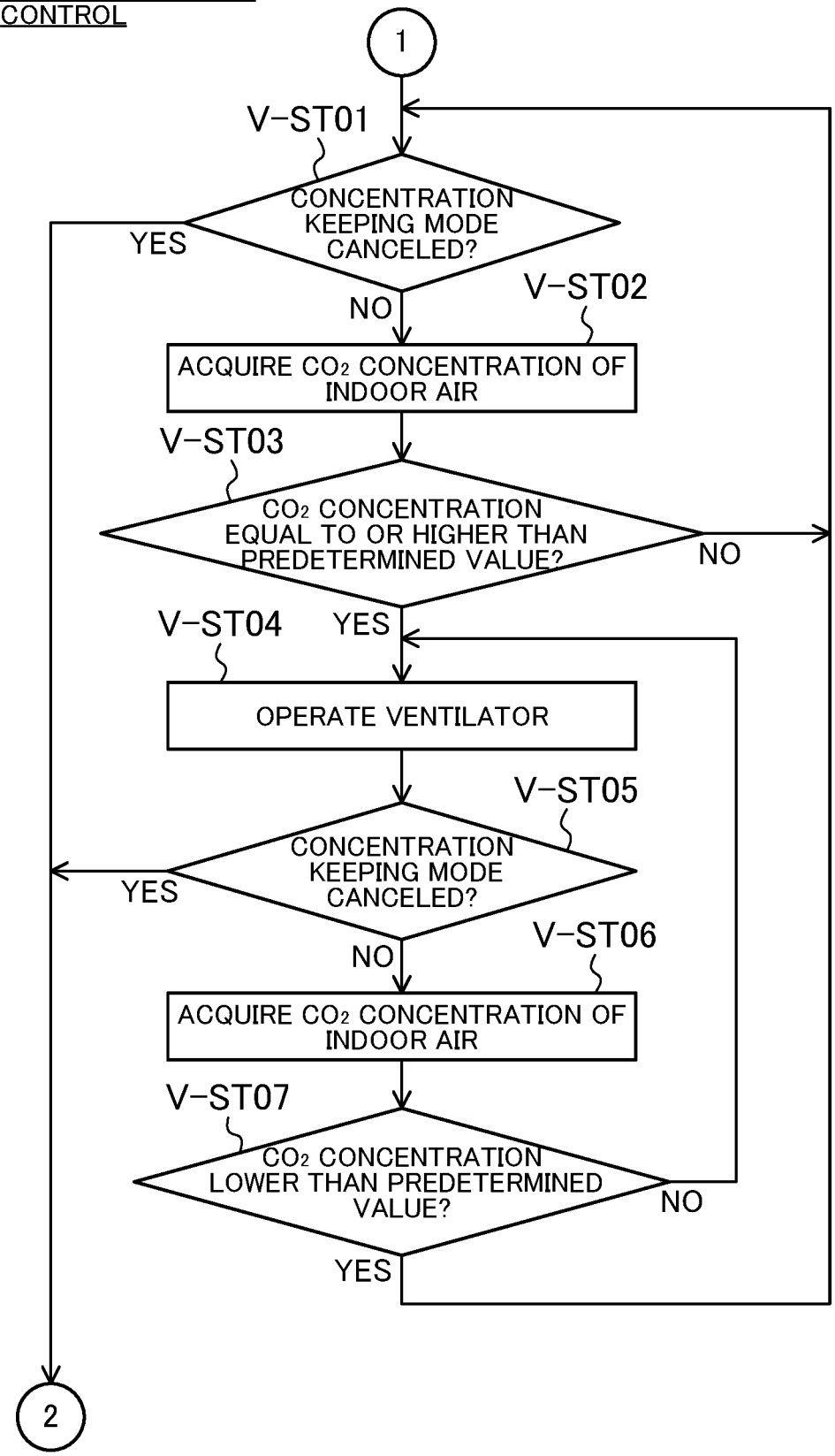
FIG. 7 is a flowchart of ventilation control in a concentration keeping mode of the air conditioner system of the embodiment.

The air conditioner system (1) performs the ventilation control according to the flowchart shown in FIG. 7.

As illustrated in FIGS. 5 to 7, the ventilation control is executed when the concentration keeping mode starts in step C-ST02 in the concentration keeping mode in the cooling operation or step H-ST02 in the concentration keeping mode in the heating operation.

As illustrated in FIG. 7, in step V-ST01, whether the concentration button is pressed again on the remote controller (9) to cancel the concentration keeping mode is first determined. If the concentration keeping mode is determined to be canceled in step V-ST01 (YES is selected), the concentration keeping mode ends and the system shifts to the normal operation mode (see FIGS. 5 and 6). If the concentration keeping mode is not determined to be canceled in step V-ST01 (NO is selected), the process proceeds to step V-ST02.

In step V-ST02, the $CO_2$ concentration of the indoor air detected by the $CO_2$ concentration sensor (49) is acquired. Then, the process proceeds to step V-ST03.

In step V-ST03, whether the $CO_2$ concentration of the indoor air is equal to or higher than a first reference value (1000 ppm) is determined. If the $CO_2$ concentration of the indoor air is detected to fall below the first reference value (1000 ppm) in step V-ST03 (NO is selected), the process returns to step V-ST01, and steps V-ST01 to V-ST03 are repeated until the concentration keeping mode is canceled or the $CO_2$ concentration of the indoor air increases to the first reference value (1000 ppm) or more.

In step V-ST03, if the $CO_2$ concentration of the indoor air is determined to be equal to or higher than the first reference value (1000 ppm) (YES is selected), the process proceeds to step V-ST04. In step V-ST04, the ventilator (7) starts operating. Then, the process proceeds to step V-ST05.

In step V-ST05, whether the concentration button is pressed again on the remote controller (9) to cancel the concentration keeping mode is determined. If the concentration keeping mode is determined to be canceled in step V-ST05 (YES is selected), the concentration keeping mode ends and the system shifts to the normal operation mode (see FIGS. 5 and 6). If the concentration keeping mode is not determined to be canceled in step V-ST05 (NO is selected), the process proceeds to step V-ST06.

In step V-ST06, the $CO_2$ concentration of the indoor air detected by the $CO_2$ concentration sensor (49) is acquired. Then, the process proceeds to step V-ST07.

In step V-ST07, whether the $CO_2$ concentration of the indoor air is less than a second reference value (900 ppm) is determined. If the $CO_2$ concentration of the indoor air is determined to be equal to or higher than the second reference value (900 ppm) in step V-ST07 (NO is selected), the process returns to step V-ST04, and steps V-ST04 to V-ST07 are repeated until the concentration keeping mode is canceled or the $CO_2$ concentration of the indoor air falls below the second reference value (900 ppm).

If the $CO_2$ concentration of the indoor air is determined to be less than the second reference value (900 ppm) in step V-ST07 (YES is selected), the process returns to step V-ST01 to perform the steps following step V-ST01.

Thus, the ventilation control is executed until the concentration keeping mode is canceled. The ventilation control thus executed controls the $CO_2$ concentration of the indoor air to the first reference value (1000 ppm) or less.

Advantages of First Embodiment

The air conditioner system (1) of the first embodiment lowers the target temperature to the first target temperature in a relatively short time in the first operation. This quickly lowers the temperature of the indoor air to be lower than a reference temperature. Thus, the lowered indoor temperature makes a person (101) in the room feel cool, giving a cool stimulus to the person (101) in the room. This can keep the person (101) in the room from feeling drowsy.

The air conditioner system (1) of the first embodiment takes a relatively long time to raise the target temperature stepwise to the second target temperature in the second operation. This gently increases the temperature of the indoor air to be higher than the reference temperature. Thus, an average temperature of the indoor air for a total period of the period of the first operation and the period of the second operation can be made comfortable for the person (101) in the room, while lessening a burden of the temperature change on the person (101) in the room. This can provide an indoor environment comfortable for the person (101) in the room.

Thus, the air conditioner system (1) of the first embodiment can keep the person in the room from feeling drowsy, and can provide a comfortable indoor environment as well. This allows the person in the room to keep the concentration, and can keep the work efficiency of the person in the room from decreasing.

The air conditioner system (1) of the first embodiment stops the indoor heat exchanger (37) when the temperature detected by the indoor air temperature sensor (45) falls below the target temperature by a predetermined temperature or more in the cooling operation. In the second operation, the target temperature is raised stepwise from the first target temperature to the second target temperature. Thus, the temperature detected by the indoor air temperature sensor (45) is less likely to fall below the target temperature by a predetermined temperature or more in the cooling operation, thereby keeping the indoor heat exchanger (37) from stopping. This configuration gives no uncomfortable feeling caused by the increase in the indoor air humidity to the person (101) in the room.

The air conditioner system (1) of the first embodiment stops the indoor heat exchanger (37) when the temperature detected by the indoor air temperature sensor (45) exceeds the target temperature by the first temperature (1.0° C.) or more in the heating operation. The target temperature is lowered to the first target temperature immediately after the start of the first operation. Thus, the first target temperature is set lower than the temperature detected by the indoor air temperature sensor (45) by the first temperature (1.0° C.) or more. Thus, the indoor heat exchanger (37) stops soon after the start of the first operation, contributing to a quick reduction of the temperature of the indoor air.

The air conditioner system (1) of the first embodiment estimates the comfortable temperature from the outdoor air temperature detected by the outdoor air temperature sensor (45) using the relationship information indicating the relationship between the comfortable temperature and the outdoor air temperature, and uses the estimated comfortable temperature as the reference temperature. Thus, a typical comfortable temperature can be estimated as the temperature of the indoor air at which the person (101) in the room feels comfortable, and can be set as the reference temperature. This is suitable for the provision of an indoor environment comfortable for the person (101) in the room by means of control of the indoor air temperature in the concentration keeping mode.

The air conditioner system (1) of the first embodiment corrects the reference temperature in accordance with the information on the individual characteristics of the person (101) in the room. This configuration reflects the information on the individual characteristics of the person (101) in the room on the reference temperature, and thus, can accurately use the temperature of the indoor air at which the person (101) in the room feels comfortable as the reference temperature. This is advantageous for the provision of an indoor environment comfortable for the person (101) in the room by means of control of the indoor air temperature in the concentration keeping mode.

The air conditioner system (1) of the first embodiment determines the target temperature and execution time of the first operation and the target temperature and execution time of the second operation according to the relational expression (1) so that the average temperature of the indoor air for the total period of a period performing the first operation and a period performing the second operation becomes the reference temperature. This is suitable for the provision of an indoor environment comfortable for the person (101) in the room by means of control of the indoor air temperature in the concentration keeping mode.

The air conditioner system (1) of the first embodiment operates the ventilator (7) when the $CO_2$ concentration of the indoor air detected by the $CO_2$ concentration sensor (49) is equal to or higher than the first reference value (1000 ppm). This configuration ventilates the room as necessary to lower the concentration of $CO_2$ in the room, and thus, is suitable for the provision of an indoor environment comfortable for the person (101) in the room.

Second Embodiment

A second embodiment will be described below.

An air conditioner system (1) of the second embodiment differs from the air conditioner system (1) of the first embodiment in how to set the reference temperature. The following description will be focused on the difference between the air conditioner system (1) of the second embodiment and the air conditioner system (1) of the first embodiment.

The air conditioner system (1) is configured to set the reference temperature using an artificial intelligence (AI).

The air conditioner system (1) stores in a storage unit (59) a learned model generated based on a parameter related to environmental information including at least one of an indoor air temperature, an indoor air humidity, an indoor illuminance, an outdoor air temperature, or an outdoor air humidity, and a parameter related to a thermal sensation of a person (101) in a room. In the second embodiment, examples of the parameter related to the environmental information of the learned model include parameters related to the indoor air temperature, the indoor air humidity, the indoor illuminance, the outdoor air temperature, and the outdoor air humidity.

The learned model may be generated by stand-alone learning. Specifically, when the person (101) in the room using the air conditioner system (1) operates the remote controller (9) to enter information on the thermal sensation of the person (101), the detection values of the indoor air temperature sensor (45), the indoor air humidity sensor (47), the illuminance sensor (51), the outdoor air temperature sensor (53), and the outdoor air humidity sensor (55) at the time of entry of the information are associated as environmental information parameters with a thermal sensation parameter of the person (101) in the room to generate the learned model.

Alternatively, the learned model may be generated by the following learning. Specifically, in a server connected to a plurality of air conditioner systems (1) via a network, the detection values of the indoor air temperature sensor (45), the indoor air humidity sensor (47), the illuminance sensor (51), the outdoor air temperature sensor (53), and the outdoor air humidity sensor (55), and the information on the thermal sensation of the person (101) in the room, which are collected from the person (101) in the room using each air conditioner system (1), are associated with each other as the environmental information parameters and the thermal sensation parameter of the person (101) corresponding to the environmental information parameters.

Using the learned model, the control unit (11) estimates the comfortable temperature based on the indoor air temperature, the indoor air humidity, the indoor illuminance, the outdoor air temperature, and the outdoor air humidity detected by the indoor air temperature sensor (45), the indoor air humidity sensor (47), the illuminance sensor (51), the outdoor air temperature sensor (53), and the outdoor air humidity sensor (55). The control unit (11) sets the comfortable temperature estimated using the learned model as a reference temperature. The control unit (11) corrects the reference temperature based on the correction information on the reference temperature as necessary.

Advantages of Second Embodiment

The air conditioner system (1) of the second embodiment estimates the comfortable temperature to be used as the reference temperature using the learned model in which the environmental information and the thermal sensation of the person (101) in the room are associated with each other. Thus, the temperature of the indoor air at which the person (101) in the room feels comfortable can be accurately estimated as the comfortable temperature and used as the reference temperature. This is advantageous for the provision of an indoor environment comfortable for the person (101) in the room by means of control of the indoor air temperature in the concentration keeping mode.

Other Embodiments

The first and second embodiments may be configured as follows.

First Variation

The indoor air temperature sensor (45) may be provided in the remote controller (9). This configuration allows the detection of the indoor air temperature near the person (101) in the room because the remote controller (9) is often placed near the person (101) in the room. This is advantageous for the provision of an indoor environment comfortable for the person (101) in the room by means of control of the indoor air temperature in the concentration keeping mode.

The indoor air temperature sensor (45) may be provided in a component separate from the indoor unit (5) other than the remote controller (9). This is not limited to the indoor air temperature sensor (45), and the indoor air humidity sensor (47), the illuminance sensor (51), and the $CO_2$ concentration sensor (49) may also be provided in a component separate from the indoor unit (5), such as the remote controller (9).

Second Variation

The relationship information such as the adaptive model of thermal comfort used by the air conditioner system (1) of the first embodiment to set the reference temperature, and the learned model used by the air conditioner system (1) of the second embodiment to set the reference temperature may be held by a server connected to the air conditioner system (1) via a network. In this case, the air conditioner system (1) may request the server for the relationship information and the information on the learned model, and may acquire information necessary for setting the reference temperature from the server.

While the embodiments and variations thereof have been described above, it will be understood that various changes in form and details may be made without departing from the spirit and scope of the claims. The embodiments and the variations thereof may be combined and replaced with each other without deteriorating intended functions of the present disclosure.

For example, the air conditioner system (1) has been described to have the outdoor unit (3) and the indoor unit (5) paired on a one-to-one basis. However, the air conditioner system is not limited to have such a configuration. The air conditioner system (1) may be of a multi-type system that includes two or more indoor units (5) for a single outdoor unit (3).

It has been described that the target temperature is lowered to the first target temperature immediately after the start of the first operation in the concentration keeping mode. However, the first operation is not limited to this operation. The target temperature is not necessarily lowered to the first target temperature immediately after the start of the first operation in the concentration keeping mode. It is only required that time taken to lower the target temperature to the first target temperature in the first operation is shorter than time taken to raise the target temperature to the second target temperature in the second operation.

It has been described that the ventilation control in the concentration keeping mode sets the first reference value of the $CO_2$ concentration for operating the ventilator (7) to 1000 ppm, and the second reference value of the $CO_2$ concentration for stopping the ventilator (7) to 900 ppm. However, the first and second reference values are not limited to these values. The first reference value of 1000 ppm and the second reference value of 900 ppm are merely exemplary values that are set to perform the ventilation control, and any values suitable for providing an indoor environment comfortable for the person in the room can be determined as the first and second reference values.

INDUSTRIAL APPLICABILITY

As can be seen from the foregoing description, the present disclosure is useful for an air conditioner system.

EXPLANATION OF REFERENCES

1 Air Conditioner System
3 Outdoor Unit
5 Indoor Unit
7 Ventilator
9 Remote Controller (Input Unit)
11 Control Unit
13 Connection Pipe
15 Connection Pipe
17 Refrigerant Circuit
19 Outdoor Circuit
21 Indoor Circuit
23 Compressor
25 Four-Way Switching Valve
27 Outdoor Heat Exchanger
29 Expansion Valve
31 Outdoor Fan
33 Refrigerant Pipe
35 Outdoor Fan Motor
37 Indoor Heat Exchanger (Temperature Regulator)
39 Indoor Fan
41 Indoor Fan Motor
43 Ventilation Fan
45 Indoor Air Temperature Sensor (Indoor Air Temperature Detector)
47 Indoor Air Humidity Sensor
49 $CO_2$ Concentration Sensor (Carbon Dioxide Concentration Detector)
51 Illuminance Sensor
53 Outdoor Air Temperature Sensor (Outdoor Air Temperature Detector)
55 Outdoor Air Humidity Sensor
57 Central Processing Unit
59 Storage Unit
101 Person in the Room
103 Desk

The invention claimed is:

1. An air conditioner system, comprising:
a temperature regulator configured to regulate a temperature of an indoor air;
an indoor air temperature detector configured to detect the temperature of the indoor air; and
a control unit configured to set a target temperature based on a predetermined reference temperature and to control the temperature regulator so that the temperature detected by the indoor air temperature detector approaches the target temperature, wherein
the control unit runs in a first mode to sequentially perform a first operation of lowering the target temperature to a first target temperature lower than the reference temperature and a second operation of raising the target temperature to a second target temperature higher than the reference temperature, each at least once, and
in the first operation, the control unit lowers the target temperature to the first target temperature in a shorter time than a time when the target temperature is raised to the second target temperature in the second operation, to decrease the temperature detected by the indoor air temperature detector toward the first target temperature over a first predetermined period, and in the second operation, in order for the first operation to give a cool stimulus to a user and prevent the user from feeling drowsy, the control unit gradually raises the target temperature from the first target temperature to the second target temperature, to increase the temperature detected by the indoor air temperature detector toward the second target temperature over a second predetermined period longer than the first predetermined period.

2. The air conditioner system of claim 1, wherein
the temperature regulator is configured as an indoor heat exchanger connected to a refrigerant circuit, and
the control unit
runs in the first mode in a cooling operation in which the indoor heat exchanger functions as an evaporator, and
stops the indoor heat exchanger when the temperature detected by the indoor air temperature detector falls below the target temperature by a predetermined temperature or more.

3. The air conditioner system of claim 1, wherein
the temperature regulator is configured as an indoor heat exchanger connected to a refrigerant circuit, and
the control unit
runs in the first mode in a heating operation in which the indoor heat exchanger functions as a radiator, and
stops the indoor heat exchanger when the temperature detected by the indoor air temperature detector exceeds the target temperature by a predetermined temperature or more.

4. The air conditioner system of claim 1, wherein
the control unit estimates a comfortable temperature of the indoor air at which a person in the room feels comfortable, and
the reference temperature is the comfortable temperature estimated by the control unit.

5. The air conditioner system of claim 4, wherein,
the control unit estimates the comfortable temperature using a learned model generated based on a parameter related to environmental information including at least one of an indoor air temperature, an indoor air humidity, an indoor illuminance, an outdoor air temperature, or an outdoor air humidity, and a parameter related to a thermal sensation of the person in the room.

6. The air conditioner system of claim 4, further comprising:
an outdoor air temperature detector configured to detect a temperature of an outdoor air; and
a storage unit configured to store relationship information indicating a relationship between the comfortable temperature and the temperature of the outdoor air, wherein
the control unit estimates the comfortable temperature based on the temperature of the outdoor air detected by the outdoor air temperature detector using the relationship information stored in the storage unit.

7. The air conditioner system of claim 4, further comprising:
an input unit configured to receive information on an individual characteristic of the person in the room, wherein
the control unit corrects the reference temperature in accordance with the information entered to the input unit.

8. The air conditioner system of claim 1, further comprising:
an indoor unit having the temperature regulator, wherein
the indoor air temperature detector is provided in a component separate from the indoor unit.

9. The air conditioner system of claim 1, wherein
suppose the reference temperature is Ta and the target temperature is Ts,
an integrated value of a temperature difference between the reference temperature and the target temperature (Ta−Ts) in a period performing the first operation is equal to an integrated value of a temperature difference between the target temperature and the reference temperature (Ts−Ta) in a period performing the second operation.

10. The air conditioner system of claim 1, further comprising:
a ventilator that ventilates the room; and
a carbon dioxide concentration detector configured to detect a carbon dioxide concentration in the room, wherein
the control unit operates the ventilator when the carbon dioxide concentration detected by the carbon dioxide concentration detector is equal to or higher than a predetermined value.

11. The air conditioner system of claim 2, wherein
the control unit estimates a comfortable temperature of the indoor air at which a person in the room feels comfortable, and
the reference temperature is the comfortable temperature estimated by the control unit.

12. The air conditioner system of claim 3, wherein
the control unit estimates a comfortable temperature of the indoor air at which a person in the room feels comfortable, and
the reference temperature is the comfortable temperature estimated by the control unit.

13. The air conditioner system of claim 5, further comprising:
an input unit configured to receive information on an individual characteristic of the person in the room, wherein
the control unit corrects the reference temperature in accordance with the information entered to the input unit.

14. The air conditioner system of claim 6, further comprising:
an input unit configured to receive information on an individual characteristic of the person in the room, wherein
the control unit corrects the reference temperature in accordance with the information entered to the input unit.

15. The air conditioner system of claim 4, further comprising:
an indoor unit having the temperature regulator, wherein the indoor air temperature detector is provided in a component separate from the indoor unit.

16. The air conditioner system of claim 7, further comprising:
an indoor unit having the temperature regulator, wherein
the indoor air temperature detector is provided in a component separate from the indoor unit.

17. The air conditioner system of claim 2, wherein
suppose the reference temperature is Ta and the target temperature is Ts,
an integrated value of a temperature difference between the reference temperature and the target temperature (Ta−Ts) in a period performing the first operation is equal to an integrated value of a temperature difference between the target temperature and the reference temperature (Ts−Ta) in a period performing the second operation.

18. The air conditioner system of claim 3, wherein
suppose the reference temperature is Ta and the target temperature is Ts,
an integrated value of a temperature difference between the reference temperature and the target temperature (Ta−Ts) in a period performing the first operation is equal to an integrated value of a temperature difference between the target temperature and the reference temperature (Ts−Ta) in a period performing the second operation.

19. The air conditioner system of claim 4, wherein
suppose the reference temperature is Ta and the target temperature is Ts,
an integrated value of a temperature difference between the reference temperature and the target temperature (Ta−Ts) in a period performing the first operation is equal to an integrated value of a temperature difference between the target temperature and the reference temperature (Ts−Ta) in a period performing the second operation.

20. The air conditioner system of claim 7, wherein
suppose the reference temperature is Ta and the target temperature is Ts,
an integrated value of a temperature difference between the reference temperature and the target temperature (Ta−Ts) in a period performing the first operation is equal to an integrated value of a temperature difference between the target temperature and the reference temperature (Ts−Ta) in a period performing the second operation.

* * * * *